United States Patent
Kisaichi et al.

(10) Patent No.: US 10,378,420 B2
(45) Date of Patent: Aug. 13, 2019

(54) SADDLE-RIDE TYPE VEHICLE

(71) Applicant: HONDA MOTOR CO., LTD., Minato-ku, Tokyo (JP)

(72) Inventors: Toru Kisaichi, Wako (JP); Hiroyuki Kaga, Wako (JP); Koichiro Matsushita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 120 days.

(21) Appl. No.: 15/730,257

(22) Filed: Oct. 11, 2017

(65) Prior Publication Data
US 2018/0112584 A1    Apr. 26, 2018

(30) Foreign Application Priority Data

Oct. 20, 2016   (JP) ................. 2016-205685

(51) Int. Cl.
*F01P 3/18* (2006.01)
*B62K 11/04* (2006.01)
(Continued)

(52) U.S. Cl.
CPC ............ *F01P 3/18* (2013.01); *B60K 11/04* (2013.01); *B62K 11/04* (2013.01); *F02B 61/02* (2013.01); *B60Y 2200/12* (2013.01)

(58) Field of Classification Search
CPC .. F01P 3/18; B60K 11/04; B62K 11/04; F02B 61/02
See application file for complete search history.

(56) References Cited

U.S. PATENT DOCUMENTS 4,577,720 A * 3/1986 Hamane .................. F02B 61/02
                                                              180/229
4,828,017 A * 5/1989 Watanabe .............. B60K 11/04
                                                              165/41
(Continued)

FOREIGN PATENT DOCUMENTS

JP    H01-202591 A    8/1989
JP    H07-2156 A      1/1995
(Continued)

OTHER PUBLICATIONS

Office Action dated Mar. 19, 2018 in the corresponding European patent application 17 197 355.5, citing the same three references as the EP Search Report issued in the same application Feb. 28, 2018.

*Primary Examiner* — Kevin Hurley
*Assistant Examiner* — Gabriela C Craciun
(74) *Attorney, Agent, or Firm* — Carrier Blackman & Associates, P.C.; Joseph P. Carrier; William D. Blackman

(57) ABSTRACT

Provided is a saddle-ride type vehicle that can improve the cooling ability when a radiator fan is provided only on one radiator of right and left radiators. A saddle-ride type vehicle has a water-cooled engine, right and left radiators supported by a body frame, and a cooling water passage that connects the right and left radiators and the water-cooled engine. A radiator fan is provided only on one radiator of the right and left radiators. One cooling water passage that connects the one radiator and the water-cooled engine has a larger diameter than the other cooling water passage that connects the other radiator and the water-cooled engine. The one radiator is larger than the other radiator.

15 Claims, 6 Drawing Sheets

(51) Int. Cl.
*F02B 61/02* (2006.01)
*B60K 11/04* (2006.01)

(56) References Cited

U.S. PATENT DOCUMENTS

| | | | |
|---|---|---|---|
| 5,992,554 A | 11/1999 | Hasumi et al. | |
| 7,987,938 B2 * | 8/2011 | Morita | B60K 11/04 |
| | | | 180/229 |
| 8,967,090 B2 | 3/2015 | Inoue et al. | |
| 9,636,995 B2 * | 5/2017 | Laroche | B62D 25/085 |
| 9,919,756 B2 * | 3/2018 | Komatsu | B62J 23/00 |
| 10,006,336 B2 * | 6/2018 | Suzuki | F01M 11/03 |
| 10,087,828 B2 * | 10/2018 | Okita | B60K 13/04 |
| 10,124,662 B2 * | 11/2018 | Jyouzaki | B62J 23/00 |
| 10,208,647 B2 * | 2/2019 | Okita | F01P 3/12 |
| 2016/0090893 A1 * | 3/2016 | Ikeda | F01P 1/06 |
| | | | 165/51 |

FOREIGN PATENT DOCUMENTS

| | | |
|---|---|---|
| JP | H07-017449 A | 1/1995 |
| JP | H08-99669 A | 4/1996 |
| JP | 2005-271636 A | 10/2005 |
| JP | 2013-103694 A | 5/2013 |

\* cited by examiner

SADDLE-RIDE TYPE VEHICLE

BACKGROUND OF THE INVENTION (1) Filed of the Invention

The present invention relates to a saddle-ride type vehicle. More specifically, the present invention relates to the cooling technology of the water-cooled engine of a saddle-ride type vehicle.

(2) Description of the Related Art

As seen in, for example, Japanese Unexamined Patent Application Publication No. 2013-103694, a saddle-ride type vehicle having right and left radiators (41, 42) supported by a body frame has been known.

A saddle-ride type vehicle provided with a radiator fan on a radiator has also been known.

In the saddle-ride type vehicle having the right and left radiators supported by the body frame, a request to provide the radiator fan only on one radiator of the right and left radiators can occur.

However, in such a case, the radiator fan is not provided on the other radiator. Consequently, how the cooling ability is improved is a problem.

An object of the present invention is to provide a saddle-ride type vehicle that can improve the cooling ability when a radiator fan is provided only on one radiator of right and left radiators.

SUMMARY OF THE INVENTION

In order to address the above object, a saddle-ride type vehicle of the present invention has a body frame disposed between a front wheel and a rear wheel, a water-cooled engine supported by the body frame, right and left radiators supported by the body frame, and a cooling water passage that connects the right and left radiators and the water-cooled engine. A radiator fan is provided only on one radiator of the right and left radiators. One cooling water passage that connects the one radiator and the water-cooled engine has a larger diameter than the other cooling water passage that connects the other radiator and the water-cooled engine.

According to the saddle-ride type vehicle, the one cooling water passage that connects, of the right and left radiators, the one radiator provided with the radiator fan and the water-cooled engine has a larger diameter than the other cooling water passage that connects the other radiator and the water-cooled engine. This construction flows a larger amount of cooling water into the one radiator provided with the radiator fan for improving the cooling ability. Thus, the entire cooling water is cooled efficiently.

That is, according to the saddle-ride type vehicle, when the radiator fan is provided only on the one radiator of the right and left radiators, the cooling ability can be improved.

In the saddle-ride type vehicle, the one radiator can be larger than the other radiator.

With such a construction, the one radiator provided with the radiator fan is larger. This construction can further improve the cooling ability.

In the saddle-ride type vehicle, the cooling water passage has a forward cooling water passage that flows cooling water from the water-cooled engine into the right and left radiators, and a return cooling water passage that returns cooling water from the right and left radiators into the water-cooled engine. The forward cooling water passage has a first cooling water passage that connects from the water-cooled engine to a branching section, a second cooling water passage that connects from the branching section to the one radiator, and a third cooling water passage that connects from the branching section to the other radiator. The second cooling water passage has a larger diameter than the third cooling water passage. The first cooling water passage has a smaller diameter than the second cooling water passage.

With such a construction, the second cooling water passage that connects from the branching section to the one radiator has a larger diameter than the third cooling water passage that connects from the branching section to the other radiator. This construction allows the amount of cooling water that flows into the one radiator to be larger than the amount of cooling water that flows into the other radiator. The first cooling water passage has a smaller diameter than the second cooling water passage. This construction can reduce the forward cooling water passage in size and weight.

In the saddle-ride type vehicle, the return cooling water passage has a fourth cooling water passage that connects from the one radiator to a merging section, a fifth cooling water passage that connects from the other radiator to the merging section, and a sixth cooling water passage that connects from the merging section to the water-cooled engine. At the merging section, the amount of bending in which the fifth cooling water passage and the sixth cooling water passage are coupled is larger than the amount of bending in which the fourth cooling water passage and the sixth cooling water passage are coupled.

With such a construction, the amount of bending of the fourth cooling water passage that connects from the one radiator to the merging section and the sixth cooling water passage is smaller than the amount of bending of the fifth cooling water passage that connects from the other radiator to the merging section and the sixth cooling water passage that connects from the merging section to the water-cooled engine. This construction can flow cooling water that returns from the one radiator more smoothly and in a larger amount. Thus, the cooling ability can be further improved.

In the saddle-ride type vehicle, the body frame has a head pipe that supports the front wheel via a front fork, and a down tube that extends downward from the head pipe. The one radiator and the other radiator are disposed on the right and left sides of the down tube. An exhaust pipe connected to an exhaust port provided on the front side of the water-cooled engine disposed rearwardly of the down tube passes below the other radiator.

With such a construction, the exhaust pipe passes below the other radiator that is the smaller radiator. This construction can facilitate the layout of the exhaust pipe, and reduce the influence of heat from the exhaust pipe with respect to the one radiator into which a large amount of cooling water flows.

DESCRIPTION OF THE PREFERRED EMBODIMENTS

Figure 1:
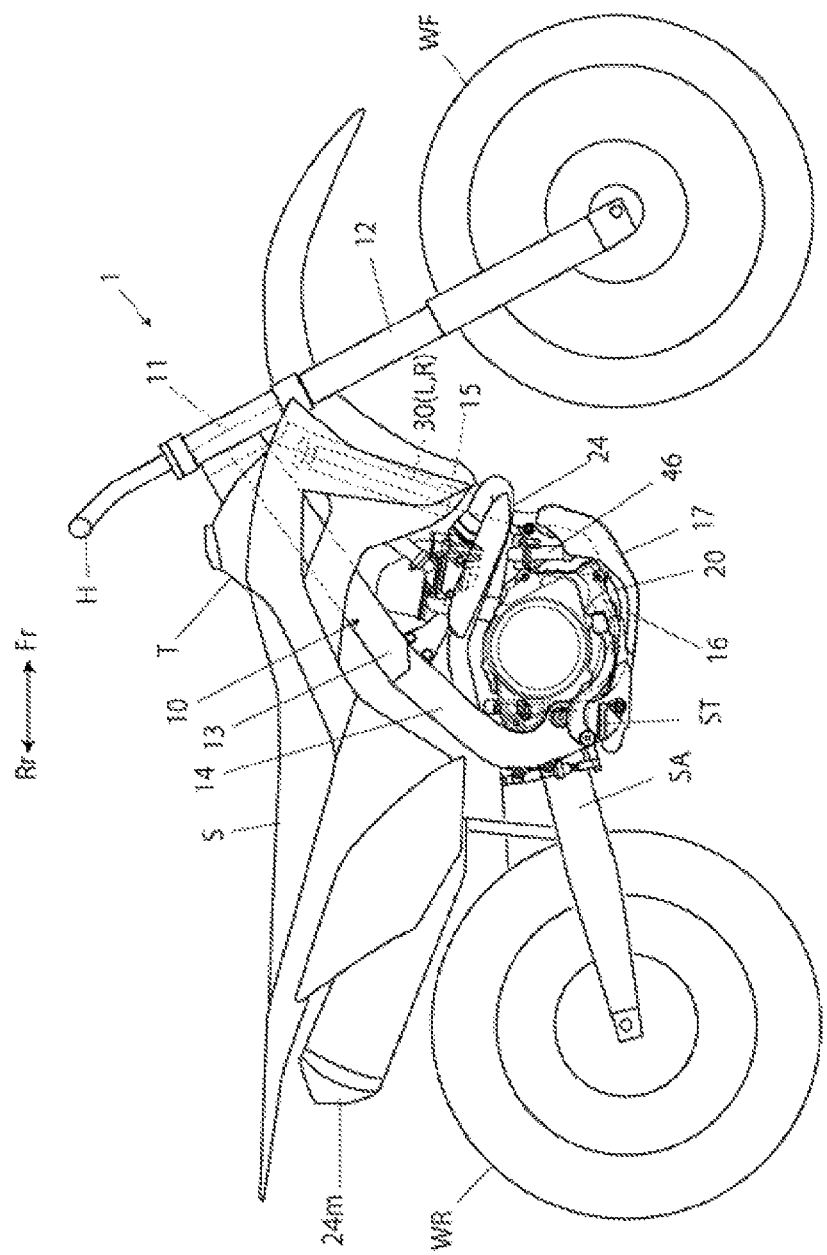
FIG. 1 is a right side view illustrating an embodiment of a saddle-ride type vehicle according to the present invention.

Hereinafter, an embodiment of a saddle-ride type vehicle according to the present invention will be described with reference to the drawings. It is to be noted that the drawings are seen in the directions of the reference signs, and in the following description, in the front, rear, left, right, up, and down directions, the front direction of the vehicle is indicated by Fr, the rear direction of the vehicle is indicated by Rr, the left direction of the vehicle is indicated by L, the right direction of the vehicle is indicated by R, the up direction of the vehicle is indicated by U, and the down direction of the vehicle is indicated by D, in the drawings, as needed, according to the direction seen from the rider. In the drawings, the same or corresponding portions are indicated by the same reference signs.

As illustrated in FIG. 1, a saddle-ride type vehicle 1 of this embodiment has a body frame 10 disposed between a front wheel WF and a rear wheel WR, a water-cooled engine 20 supported by the body frame 10, right and left radiators 30(L, R) supported by the body frame 10, and a cooling water passage 40 (FIG. 3) that connects the right and left radiators 30(L, R) and the water-cooled engine 20.

Figure 3:
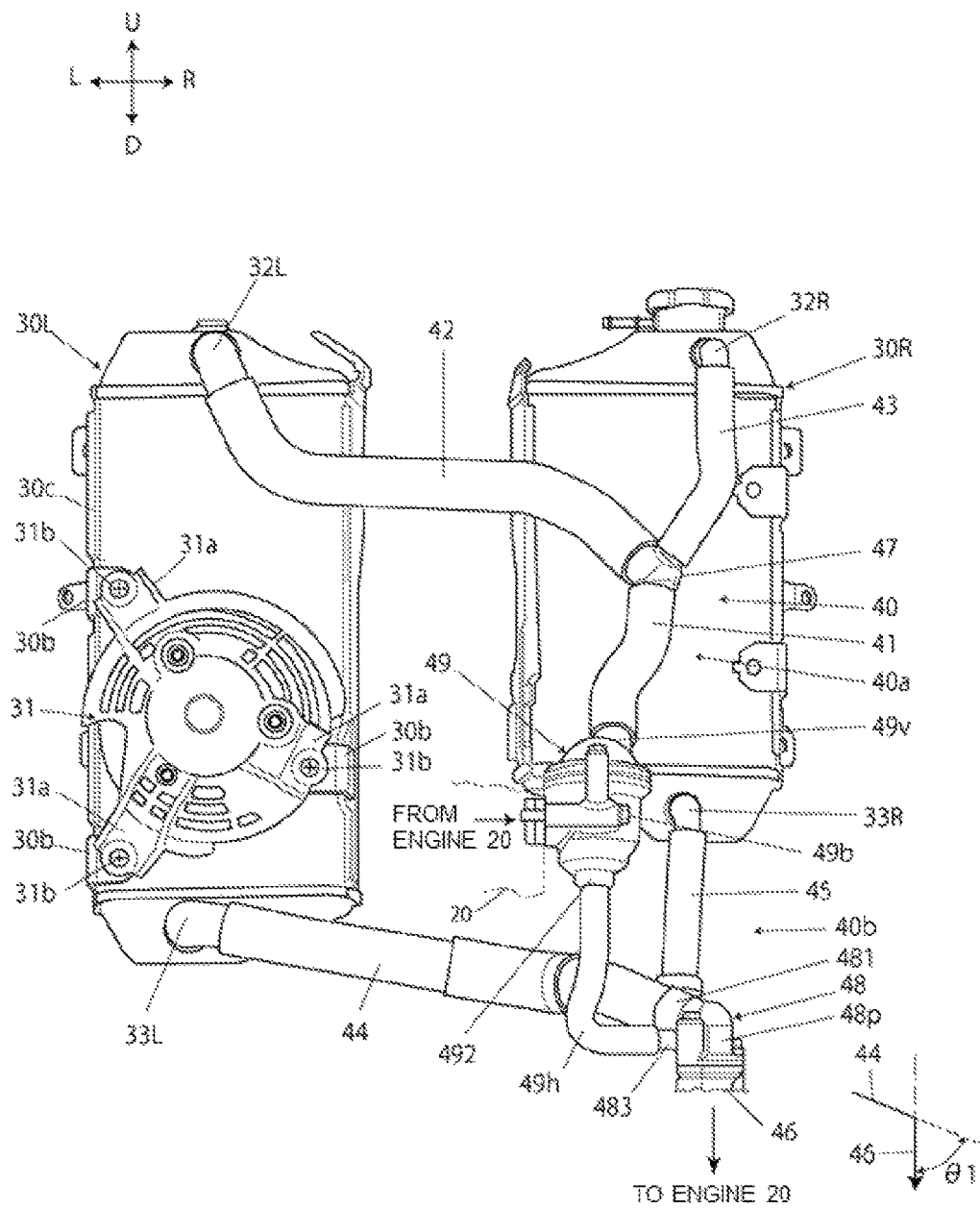
FIG. 3 is an enlarged rear view illustrating radiators and cooling water passages of the saddle-ride type vehicle.

As illustrated in FIG. 3, a radiator fan 31 is provided only on one radiator (in this embodiment, the left radiator 30L) of the right and left radiators 30(L, R). Moreover, one cooling water passage 42 that connects the one radiator 30L and the water-cooled engine 20 has a larger diameter than the other cooling water passage 43 that connects the other radiator 30R and the water-cooled engine 20.

According to the saddle-ride type vehicle 1, the one cooling water passage 42 that connects, of the right and left radiators 30(L, R), the one radiator 30L provided with the radiator fan 31 and the water-cooled engine 20 has a larger diameter than the other cooling water passage 43 that connects the other radiator 30R and the water-cooled engine 20. This construction flows a larger amount of cooling water into the one radiator 30L provided with the radiator fan 31 for improving the cooling ability. Thus, the entire cooling water is cooled efficiently.

That is, according to the saddle-ride type vehicle, when the radiator fan 31 is provided only on the one radiator of the right and left radiators 30(L, R), the cooling ability of the entire saddle-ride type vehicle can be improved.

The mounting construction of the radiator fan 31 on the radiator 30L can adopt an appropriate construction.

In this embodiment, three stays 30b are provided in a case 30c of the radiator 30L so as to be integral thereon, and mounting arms 31a of the radiator fan 31 are fastened and fixed on the stays 30b by bolts 31b, thereby mounting the radiator fan 31 on the radiator 30L.

The one radiator 30L is a radiator larger than the other radiator 30R.

With such a construction, the one radiator 30L provided with the radiator fan 31 is larger. This construction can further improve the cooling ability.

The cooling water passage 40 has a forward cooling water passage 40a that flows cooling water from the water-cooled engine 20 into the right and left radiators 30(L, R), and a return cooling water passage 40b that returns cooling water from the right and left radiators 30(L, R) into the water-cooled engine 20.

The forward cooling water passage 40a has a first cooling water passage 41 that connects from the water-cooled engine 20 to a branching section 47, the second cooling water passage 42 that connects from the branching section 47 to the one radiator 30L, and the third cooling water passage 43 that connects from the branching section 47 to the other radiator 30R.

The second cooling water passage 42 has a larger diameter than the third cooling water passage 43. The first cooling water passage 41 has a smaller diameter than the second cooling water passage 42.

With such a construction, the second cooling water passage 42 that connects from the branching section 47 to the one radiator 30L has a larger diameter than the third cooling water passage 43 that connects from the branching section 47 to the other radiator 30R. This construction allows the amount of cooling water that flows into the one radiator 30L to be larger than the amount of cooling water that flows into the other radiator 30R. The first cooling water passage 41 has a smaller diameter than the second cooling water passage 42. This construction can reduce the forward cooling water passage 40a in size and weight.

The return cooling water passage 40b has a fourth cooling water passage 44 that connects from the one radiator 30L to a merging section 48, a fifth cooling water passage 45 that connects from the other radiator 30R to the merging section 48, and a sixth cooling water passage 46 (see FIG. 5) that connects from the merging section 48 to the water-cooled engine 20.

Figure 4:
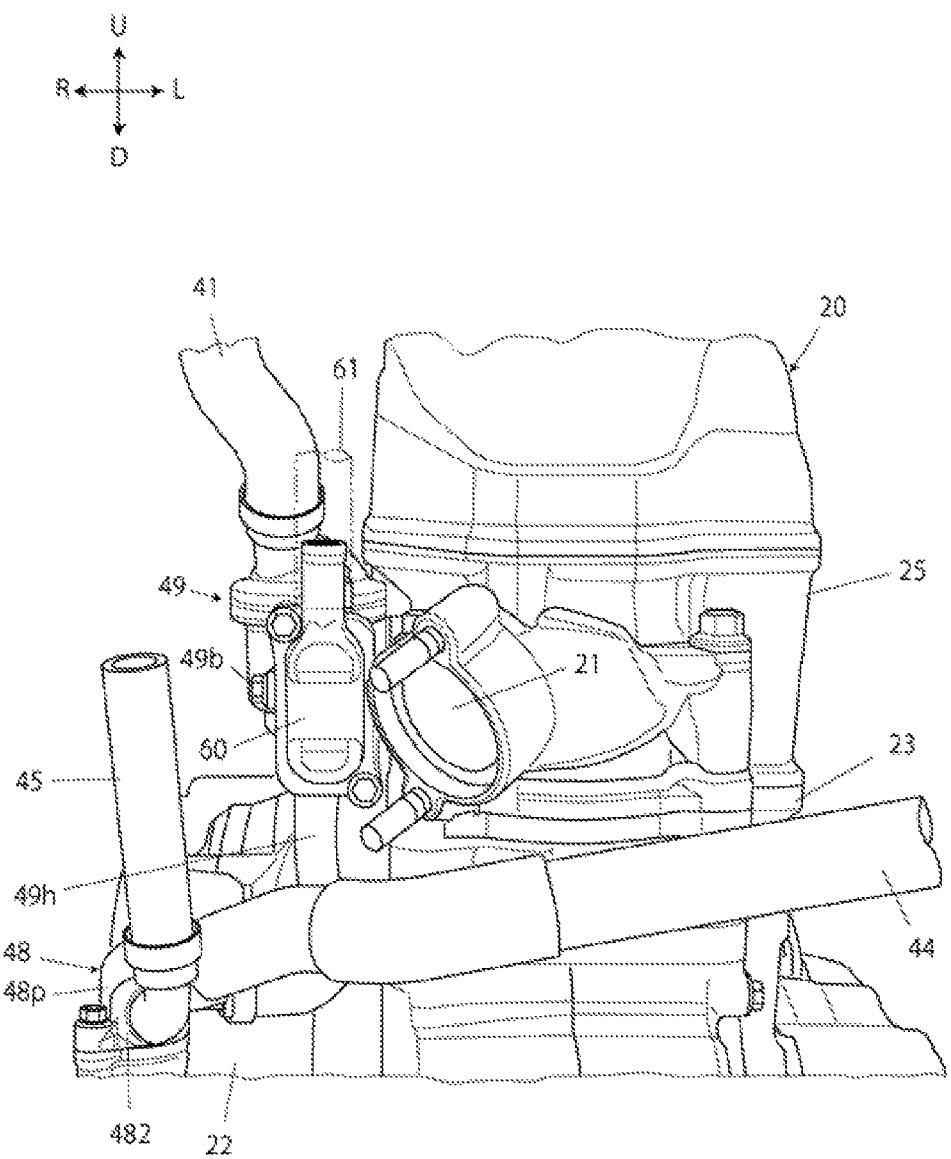
FIG. 4 is a front view, partially omitted, of a water-cooled engine.
Figure 5:
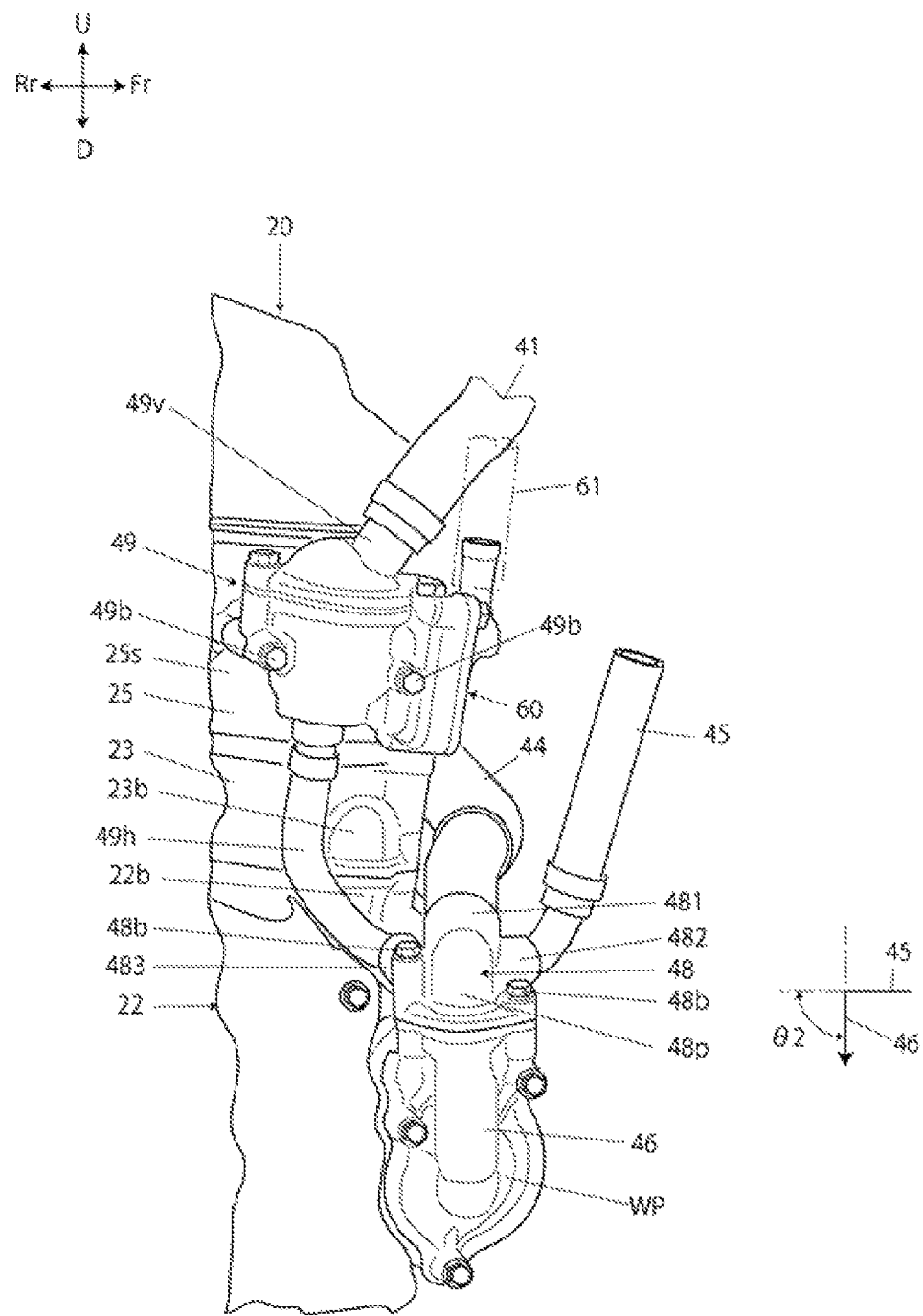
FIG. 5 is a perspective view, partially omitted, of the water-cooled engine.

As illustrated in FIGS. 3 to 5, at the merging section 48, the fourth cooling water passage 44 and the sixth cooling water passage 46 are coupled with a small amount of bending, and the fifth cooling water passage 45 and the sixth cooling water passage 46 are coupled with a large amount of bending.

With such a construction, the amount of bending of the fourth cooling water passage 44 that connects from the one radiator 30L to the merging section 48 and the sixth cooling water passage 46 is smaller than the amount of bending of the fifth cooling water passage 45 that connects from the other radiator 30R to the merging section 48 and the sixth cooling water passage 46 that connects from the merging section 48 to the water-cooled engine 20. This construction can flow cooling water that returns from the one radiator 30L more smoothly and in a larger amount. Thus, the cooling ability can be further improved.

It is to be noted that in FIG. 5, the fourth cooling water passage 44 that connects from the one radiator 30L to the merging section 48 and the sixth cooling water passage 46 are straight, and in FIG. 3, the fourth cooling water passage 44 and the sixth cooling water passage 46 form an obtuse angle, so that the amount of bending of the fourth cooling water passage 44 that connects from the one radiator 30L to the merging section 48 and the sixth cooling water passage 46 forms an acute angle, as indicated by θ1 in FIG. 3. In contrast, as illustrated in FIG. 5, the fifth cooling water passage 45 that connects from the other radiator 30R to the merging section 48 is connected to the merging section 48 via a connecting section 482, the connecting section 482 being at a substantially right angle with respect to the sixth cooling water passage 46 that connects from the merging section 48 to the water-cooled engine 20, so that the amount of bending of the fifth cooling water passage 45 that connects from the other radiator 30R to the merging section 48 and the sixth cooling water passage 46 that connects from the merging section 48 to the water-cooled engine 20 forms a right angle, as indicated by θ2 in FIG. 5.

Thus, at the merging section 48, the fourth cooling water passage 44 and the sixth cooling water passage 46 are coupled with a small amount of bending (θ1), and the fifth cooling water passage 45 and the sixth cooling water passage 46 are coupled with a large amount of bending (θ2).

Figure 2:
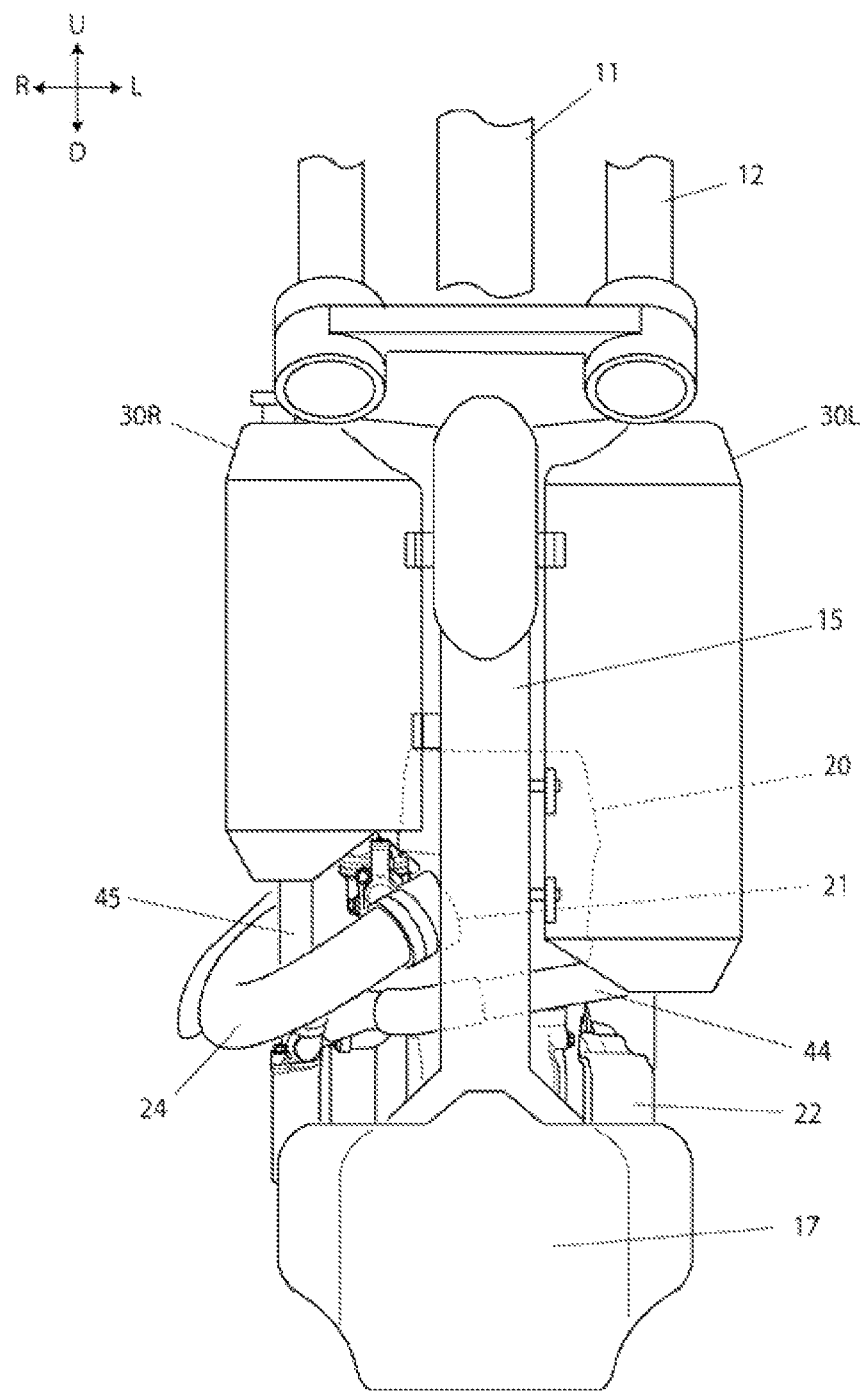
FIG. 2 is an enlarged front view, partially omitted, of the saddle-ride type vehicle.

As illustrated in FIGS. 1 and 2, the body frame 10 has a head pipe 11 that supports the front wheel WF via a front fork 12, and a down tube 15 that extends downward from the head pipe 11.

The one radiator 30L and the other radiator 30R are disposed on the right and left sides of the down tube 15. An exhaust pipe 24 connected to an exhaust port 21 (FIG. 4) provided on the front side of the water-cooled engine 20 disposed rearwardly of the down tube 15 passes below the other radiator 30R.

With such a construction, the exhaust pipe 24 passes below the other radiator 30R that is the smaller radiator. This construction can facilitate the layout of the exhaust pipe 24, and reduce the influence of heat from the exhaust pipe 24 with respect to the one radiator 30L into which a large amount of cooling water flows. Thus, the reduction in the cooling efficiency due to heat release from the exhaust pipe 24 can be prevented.

As illustrated in FIG. 1, the body frame 10 has a main tube 13 that extends rearwardly and downwardly from the head pipe 11, a pivot frame 14 that extends downward from the rear end of the main tube 13, the down frame 15, and a lower frame 16 that couples the lower end of the down frame 15 and the lower end of the pivot frame 14. The rear wheel WR is supported by the pivot frame 14 so as to be swingable by a swing arm SA.

H denotes a handlebar, T denotes a fuel tank, S denotes a seat on which the rider is to sit, ST denotes a step on which the rider is to place his/her feet, and 24m denotes a muffler provided in the rear portion of the exhaust pipe 24.

In FIGS. 1 and 2, the reference sign 17 denotes a lower cover that covers the engine from its front portion to its bottom portion.

As illustrated in FIG. 4, the water-cooled engine 20 has a crankcase 22 disposed on the lower side thereof, and a cylinder 23 (including a cylinder head 25) that extends upward from the crankcase 22.

As illustrated in FIG. 5, a water pump WP that supplies cooling water from the radiators 30(L, R) to the engine 20 is mounted on the crankcase 22.

The merging section 48 includes a cap-shaped collecting pipe 48p that is coupled to the upper portion of the water pump WP by a bolt 48b. The collecting pipe 48p has first to third connecting pipes (connecting sections) 481, 482, and 483. The sixth cooling water passage 46 is integrally formed on the water pump WP, and communicates with the collecting pipe 48p, that is, the first to third connecting pipes 481, 482, and 483.

In FIG. 3, the reference sign 49 is a thermostat mounted on the cylinder 25 of the engine 20 and into which cooling water from the engine 20 flows.

The branching section 47 includes a branching pipe in which its entire shape is Y-shape.

The first cooling water passage 41 includes a radiator hose (41) that is connected to an outlet pipe 49v of the thermostat 49 and the branching section 47.

The second cooling water passage 42 includes a radiator hose (42) that is connected to the branching section 47 and an inlet pipe 32L that is provided in the upper portion of the one radiator 30L.

The third cooling water passage 43 includes a radiator hose (43) that is connected to the branching section 47 and an inlet pipe 32R that is provided in the upper portion of the other radiator 30R.

The fourth cooling water passage 44 includes a radiator hose (44) that is connected to an outlet pipe 33L that is provided in the lower portion of the one radiator 30L and the first connecting pipe 481 of the collecting pipe 48p.

The fifth cooling water passage 45 includes a radiator hose (45) that is connected to an outlet pipe 33R that is provided in the lower portion of the other radiator 30R and the second connecting pipe 482 (FIG. 5) of the collecting pipe 48p.

It is to be noted that the third connecting pipe 483 of the collecting pipe 48p is connected to a second outlet pipe 492 of the thermostat 49 by a radiator hose 49h.

Cooling water is circulated by the operation of the water pump WP in the following order: the water pump WP, the water jacket in the crankcase 22 of the water-cooled engine 20 (an outflow path outer wall from the water jacket to the water jacket of the cylinder is indicated by the reference sign 22b in FIG. 5), the water jacket of the cylinder 23 of the water-cooled engine 20 (an inflow path outer wall to the water jacket is indicated by the reference sign 23b in FIG. 5), the water jacket of the cylinder head 25, an outflow path 25b (FIG. 6) from the water jacket of the cylinder head 25, the thermostat 49, the first cooling water passage 41, the branching section 47, the second cooling water passage 42 and the third cooling water passage 43, the radiators 30L and 30R, the fourth cooling water passage 44 and the fifth cooling water passage 45, the collecting pipe 48p, the sixth cooling water passage 46, and the water pump WP.

The basic construction itself of the thermostat 49 is well-known. The thermostat 49 has a flow passage switching valve therein, and supplies cooling water from the engine through the forward cooling water passage 40a into the radiators 30L and 30R when the cooling water that flows from the water jacket of the cylinder head 25 through the outflow path 25b (FIG. 6) into the thermostat 49 is equal to or more than a predetermined temperature.

In contrast, when cooling water that flows from the water jacket of the cylinder head 25 through the outflow path 25b (FIG. 6) into the thermostat 49 is less than the predetermined temperature, the cooling water from the engine is returned from the second outlet pipe 492 through the radiator hose 49h and the collecting pipe 48p into the water pump WP.

Figure 6:
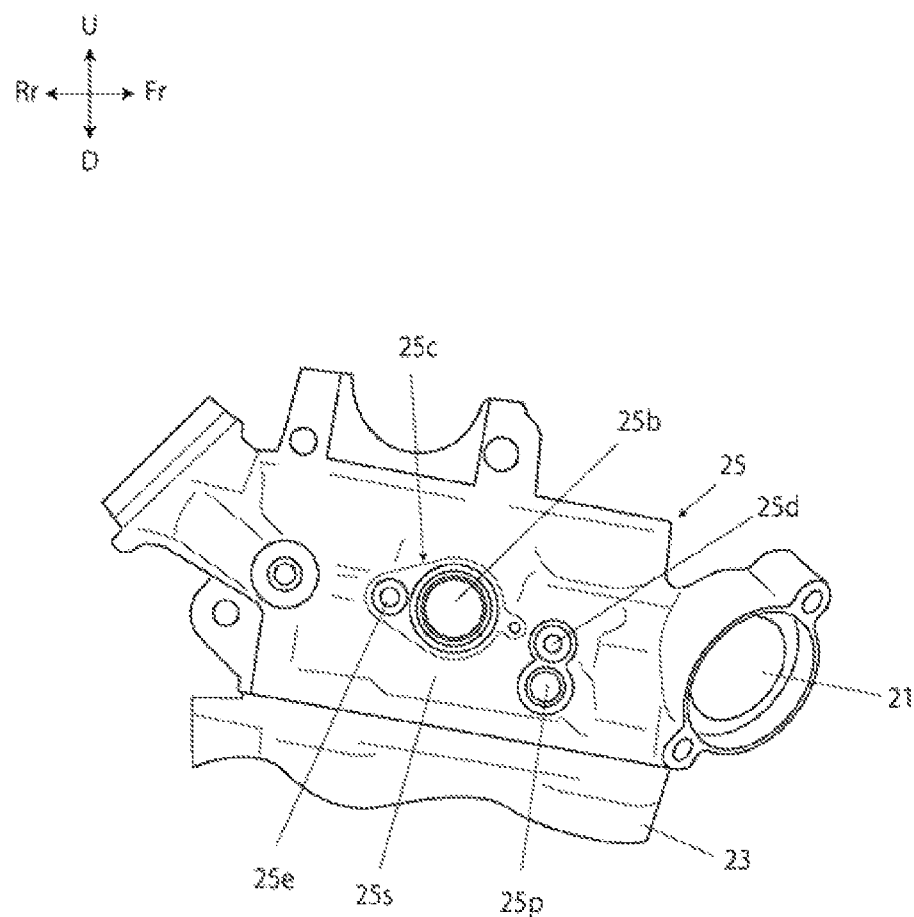
FIG. 6 is a right side view mainly illustrating a cylinder head.

As illustrated in FIG. 6, a connecting section 25c for connecting the thermostat 49 to the outflow path 25b is provided in a side portion 25s of the cylinder head 25. The thermostat 49 is fastened and fixed to the connecting section 25c by fixing bolts 49b (FIGS. 3 to 5), so that the outflow path 25b from the water jacket communicates into the thermostat 49.

In FIG. 6, the reference signs 25d and 25e are internal thread holes into which the fixing bolts 49b are coupled.

In FIGS. 4 and 5, the reference sign 60 denotes a check valve that supplies secondary air to an exhaust passage 21 through the exhaust port of the water-cooled engine 20. The case of the check valve 60 is integrally formed on the case of the thermostat 49. The check valve 60 communicates with the atmosphere through an air cleaner, not shown, by a secondary air passage 61 indicated by the imaginary line in FIGS. 4 and 5. In FIG. 6, the reference sign 25p denotes a secondary air supply path that is provided in the cylinder head 25, and communicates with the check valve 60.

The embodiment of the present invention has been described above, but the present invention is not limited to the above embodiment, and can be appropriately modified and embodied within the scope of the purport of the present invention.

What is claimed is:

1. A saddle-ride type vehicle comprising:
a body frame disposed between a front wheel and a rear wheel;
a water-cooled engine supported by the body frame;
right and left radiators supported by the body frame; and
a cooling water passage that connects the right and left radiators and the water-cooled engine,
wherein a radiator fan is provided only on one radiator of the right and left radiators,
wherein one cooling water passage that connects the one radiator and the water-cooled engine has a larger diameter than the other cooling water passage that connects the other radiator and the water-cooled engine.

2. The saddle-ride type vehicle according to claim 1, wherein the one radiator is larger than the other radiator.

3. The saddle-ride type vehicle according to claim 1, wherein the cooling water passage has:
a forward cooling water passage that flows cooling water from the water-cooled engine into the right and left radiators; and
a return cooling water passage that returns cooling water from the right and left radiators into the water-cooled engine,
wherein the forward cooling water passage has a first cooling water passage that connects from the water-cooled engine to a branching section;
a second cooling water passage that connects from the branching section to the one radiator; and
a third cooling water passage that connects from the branching section to the other radiator,
wherein the second cooling water passage has a larger diameter than the third cooling water passage,
wherein the first cooling water passage has a smaller diameter than the second cooling water passage.

4. The saddle-ride type vehicle according to claim 2, wherein the cooling water passage has:
a forward cooling water passage that flows cooling water from the water-cooled engine into the right and left radiators; and
a return cooling water passage that returns cooling water from the right and left radiators into the water-cooled engine,
wherein the forward cooling water passage has a first cooling water passage that connects from the water-cooled engine to a branching section;
a second cooling water passage that connects from the branching section to the one radiator; and
a third cooling water passage that connects from the branching section to the other radiator,
wherein the second cooling water passage has a larger diameter than the third cooling water passage,
wherein the first cooling water passage has a smaller diameter than the second cooling water passage.

5. The saddle-ride type vehicle according to claim 1, wherein the cooling water passage has:
a forward cooling water passage that flows cooling water from the water-cooled engine into the right and left radiators; and
a return cooling water passage that returns cooling water from the right and left radiators to the water-cooled engine,
wherein the return cooling water passage has:
a fourth cooling water passage that connects from the one radiator to a merging section;
a fifth cooling water passage that connects from the other radiator to the merging section; and
a sixth cooling water passage that connects from the merging section to the water-cooled engine,
wherein at the merging section, the amount of bending in which the fifth cooling water passage and the sixth cooling water passage are coupled is larger than the amount of bending in which the fourth cooling water passage and the sixth cooling water passage are coupled.

6. The saddle-ride type vehicle according to claim 2, wherein the cooling water passage has:
a forward cooling water passage that flows cooling water from the water-cooled engine into the right and left radiators; and
a return cooling water passage that returns cooling water from the right and left radiators to the water-cooled engine,
wherein the return cooling water passage has:
a fourth cooling water passage that connects from the one radiator to a merging section;
a fifth cooling water passage that connects from the other radiator to the merging section; and
a sixth cooling water passage that connects from the merging section to the water-cooled engine,
wherein at the merging section, the amount of bending in which the fifth cooling water passage and the sixth cooling water passage are coupled is larger than the amount of bending in which the fourth cooling water passage and the sixth cooling water passage are coupled.

7. The saddle-ride type vehicle according to claim 3, wherein the cooling water passage has:
a forward cooling water passage that flows cooling water from the water-cooled engine into the right and left radiators; and
a return cooling water passage that returns cooling water from the right and left radiators to the water-cooled engine,
wherein the return cooling water passage has:
a fourth cooling water passage that connects from the one radiator to a merging section;
a fifth cooling water passage that connects from the other radiator to the merging section; and
a sixth cooling water passage that connects from the merging section to the water-cooled engine,
wherein at the merging section, the amount of bending in which the fifth cooling water passage and the sixth cooling water passage are coupled is larger than the amount of bending in which the fourth cooling water passage and the sixth cooling water passage are coupled.

8. The saddle-ride type vehicle according to claim 4, wherein the cooling water passage has:
a forward cooling water passage that flows cooling water from the water-cooled engine into the right and left radiators; and
a return cooling water passage that returns cooling water from the right and left radiators to the water-cooled engine,
wherein the return cooling water passage has:
a fourth cooling water passage that connects from the one radiator to a merging section;
a fifth cooling water passage that connects from the other radiator to the merging section; and a sixth cooling water passage that connects from the merging section to the water-cooled engine, wherein at the merging section, the amount of bending in which the fifth cooling water passage and the sixth cooling water passage are coupled is larger than the amount of bending in which the fourth cooling water passage and the sixth cooling water passage are coupled.

9. The saddle-ride type vehicle according to claim 2, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

10. The saddle-ride type vehicle according to claim 3, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

11. The saddle-ride type vehicle according to claim 4, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

12. The saddle-ride type vehicle according to claim 5, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

13. The saddle-ride type vehicle according to claim 6, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

14. The saddle-ride type vehicle according to claim 7, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

15. The saddle-ride type vehicle according to claim 8, wherein the body frame has:

a head pipe that supports the front wheel via a front fork; and a down tube that extends downward from the head pipe, wherein the one radiator and the other radiator are disposed on the right and left sides of the down tube, wherein an exhaust pipe connected to an exhaust port provided on the front side of the water-cooled engine disposed rearwardly of the down tube passes below the other radiator.

* * * * *